United States Patent
Gu

(10) Patent No.: US 11,780,688 B2
(45) Date of Patent: Oct. 10, 2023

(54) CONVEYOR, CONVEYING SYSTEM AND MANUFACTURING METHOD OF CONVEYOR

(71) Applicant: ABB Schweiz AG, Baden (CH)

(72) Inventor: Hao Gu, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/755,270

(22) PCT Filed: Nov. 22, 2019

(86) PCT No.: PCT/CN2019/120267
§ 371 (c)(1),
(2) Date: Apr. 25, 2022

(87) PCT Pub. No.: WO2021/097806
PCT Pub. Date: May 27, 2021

(65) Prior Publication Data
US 2022/0388789 A1 Dec. 8, 2022

(51) Int. Cl.
*B65G 54/02* (2006.01)
(52) U.S. Cl.
CPC ..................... *B65G 54/02* (2013.01)
(58) Field of Classification Search
CPC ....................................... B65G 54/02
USPC ....................................... 198/805
See application file for complete search history.

(56) References Cited

U.S. PATENT DOCUMENTS 10,106,339 B2 * 10/2018 Prüssmeier ............ B65G 35/06
10,745,212 B2 * 8/2020 Chi ...................... B65G 37/005

2013/0026011 A1 * 1/2013 van de Loecht ....... B65G 17/06
198/800
2015/0303841 A1 10/2015 Suzuki et al.
2016/0176560 A1 * 6/2016 Aumann ............... B65B 59/005
53/473
2016/0207720 A1 7/2016 Hanisch et al.
(Continued)

FOREIGN PATENT DOCUMENTS

CA 3049441 * 1/2020 ............ B65G 54/02
CN 105151803 A 12/2015
(Continued)

OTHER PUBLICATIONS

International Search Report and Written Opinion, issued by the ISA/CN National Intellectual Property Administration regarding corresponding patent application Serial No. PCT/CN2019/120267; dated Aug. 24, 2020; 9 pages.

*Primary Examiner* — James R Bidwell
(74) *Attorney, Agent, or Firm* — Greenberg Traurig, LLP

(57) ABSTRACT

Present disclosure provide a conveyor, a conveying system having the same, and a method of manufacturing the conveyor. The conveyor comprises a carrying member adapted to carry an object to be conveyed. The conveyor also comprises a plurality of rollers arranged under the carrying member and adapted to be guided to move along guide rails in a first direction. The conveyor further comprises a first magnetic engaging portion arranged to extend from a lower surface of the carrying member to a position near to the guide rails in a second direction normal to the first direction, and adapted to interact with a second magnetic engaging portion on the guide rails, to generate a driving force for driving the conveyor in the first direction.

17 Claims, 6 Drawing Sheets

(56) References Cited

U.S. PATENT DOCUMENTS

2018/0208414 A1    7/2018   Gu et al.
2019/0283974 A1    9/2019   Gu et al.

FOREIGN PATENT DOCUMENTS

| CN | 105899447 | A | | 8/2016 | |
|---|---|---|---|---|---|
| CN | 110035965 | A | | 7/2019 | |
| EP | 1013574 | A | | 6/2000 | |
| JP | H10287233 | A | | 10/1998 | |
| KR | 100699271 | A | | 3/2007 | |
| WO | 2015/028223 | | * | 3/2015 | ............ B65G 54/02 |
| WO | 2017050524 | W | | 3/2017 | |
| WO | 2018119665 | A1 | | 7/2018 | |
| WO | 2018145214 | A1 | | 8/2018 | |

* cited by examiner

CONVEYOR, CONVEYING SYSTEM AND MANUFACTURING METHOD OF CONVEYOR

CROSS-REFERENCE TO RELATED APPLICATIONS

This is a national stage application which claims priority to International patent application Serial No.: PCT/CN2019/120267, filed on Nov. 22, 2019; and which is herein incorporated by reference in its entirety.

FIELD

Embodiments of the present disclosure generally relate to a conveyor, a conveying system having the same and a method of manufacturing the conveyor.

BACKGROUND

Cleanroom production lies at the heart of many of the world's leading industries. These include pharmaceutical, medical, semiconductor, etc. For example, in a Computer, Communication and Consumer (3C) industries, various products need to be assembled in a clean room, i.e. a dustless environment. Thus, components to be assembled are required to be carried and conveyed to the clean room rapidly and safety.

In a conventional way, the supporting member is driven by a rack-pinion mechanism through mechanical engagement or driven by a belt, a roller, and a link plate through friction. In this case, particles generated by mechanical engagement or friction cannot be ignored.

To eliminate most of contacting during conveying with simple structure and low-cost, it has been considered using a magnetic conveyor for clean room. However, this conveyor has the limitation of speed (400 mm/s) due to the tangible magnetic field engagement between the magnetic gear and rack, which becomes a bottleneck for further reducing the production cycle time.

SUMMARY

Embodiments of the present disclosure provide a conveyor, a conveying system having the same and a method of manufacturing the conveyor.

In a first aspect, a conveyor is provided. The conveyor comprises a carrying member adapted to carry an object to be conveyed. The conveyor also comprises a plurality of rollers arranged under the carrying member and adapted to be guided to move along guide rails in a first direction. The conveyor further comprises a first magnetic engaging portion arranged to extend from a lower surface of the carrying member to a position near to the guide rails in a second direction normal to the first direction, and adapted to interact with a second magnetic engaging portion on the guide rails, to generate a driving force for driving the conveyor in the first direction.

The conveyor of the first aspect proposes a novel arrangement of magnetic engaging portion on the conveyor, which may extend from the lower surface of the carrying member still a position adjacent to the guide rails. In this way, the first magnetic engaging portion on the conveyor may interact better with the second magnetic engagement portion when a magnetic field is generated at the second magnetic engagement portion, thereby a sufficient driving force can be generated to improve the carrying capacity of the conveyor.

Meanwhile, the conveyor will be lifted up at an assembly location. The first magnetic engaging portion of the first aspect makes it easier to separate the first magnetic engaging portion from the the second magnetic engagement portion at a tangible direction of the the second magnetic engagement portion. Without step change of magnetic force during separating, the lifting up motion can be smoother.

In some embodiments, the first magnetic engaging portion may comprise a first set of magnetic racks and a second set of magnetic racks. The second set of magnetic racks are arranged opposite to the first set of magnetic racks at a predetermined distance from the first set of magnetic racks such that the second magnetic engaging portion is located between the first set of magnetic racks and the second set of magnetic racks.

In this way, a plurality of magnetic racks can be arranged around the second magnetic engaging portion, which is protruded from the guide rails such that the magnetic coupling between the first magnetic engaging portion and the second magnetic engaging portion becomes more strengthen. Therefore, the driving capacity of the magnetic conveyor, especially the speed and load capacity of the conveyor can be significantly increased with the embraced magnetic field engagement around the second magnetic engaging portion.

In some embodiments, the first magnetic engaging portion may further comprise a connecting element fixed on the lower surface of the carrying member and a pair of first supporting members connected to the connecting element and adapted to support the first set of magnetic racks and the second set of magnetic racks respectively.

The connecting element and the pair of first supporting members may achieve a simple and stable connection of plurality of sets of magnetic racks to the carrying member, which is an indispensable intermediate structure for implementing the rack arrangement of the present disclosure.

In some embodiments, the first set of magnetic racks and the second set of magnetic racks may be arranged to be inclined in opposite directions with respect to the second direction on the respective first supporting members.

In some embodiments, the first set of magnetic racks may be inclined to form a predetermined angle with the second set of magnetic racks and the predetermined angle corresponds to half of an inclination angle of a magnetic pole generated by the second magnetic engagement portion with respect to the second direction.

The inclined first set of magnetic racks and the second set of magnetic racks may interact with the second magnetic engaging portion, respectively, to generate driving force in a same direction, such that the conveyor can be driven from both sides. By this inclination arrangement of the first and the second magnetic engagement portions, the driving force caused by the magnetic field may be optimized and therefore the plurality of rollers can slide more smoothly and rapidly.

In some embodiments, the conveyor may further comprise a third magnetic engaging portion arranged on the connecting element and adapted to interact with the second magnetic engaging portion on the guide rails, which may further increase the driving capacity of the magnetic conveyor.

In some embodiments, the conveyor may further comprise a pair of second supporting members fixed on the lower surface of the carrying member. The plurality of rollers may be mounted on the respective second supporting members such that a second height from a lower end of the connecting element to a bottom of the magnetic engagement portion is greater than a first height of the second magnetic engagement portion.

Since the rack arrangement is changed to improve the driving capacity, the height of the conveyor may be adjusted to avoid the contact between the connecting element and the second magnetic engagement portion, because particles may be generated due to the friction during the conveying, which is unexpected for the dustless environment. The arrangement of the second supporting members may lift the height of the conveyor, which maintains the first magnetic engaging portion to be located at a position near the second magnetic engaging portion without contacting the second magnetic engagement portion.

In some embodiments, the conveyor may further comprise a pair of third supporting members fixed on the respective second supporting members and limiting member mounted in the respective third supporting members and adapted to limit the movement of the conveyor on the guide rails. In this way, the conveyor can be maintained on the guide rails to ensure a stable conveying process.

In a second aspect, a conveying system is provided. The conveying system comprises a conveyor according to the first aspect. The conveying system further comprises guide rails adapted to guide the plurality of rollers to move the conveyor in the first direction. The conveying system also comprises a driving shaft arranged between the guide rails and adapted to be driven to rotate in a third direction. Furthermore, the conveying system comprises a second magnetic engaging portion comprising a plurality of magnetic gear arranged on the driving shaft and adapted to rotate with the rotation of the driving shaft, to generate a magnetic field.

Due to the increased driving capacity of the conveyor, a conveying system with a simple structure and low-cost can be achieved, thereby the performance and the efficiency of the conveying system can be improved.

In some embodiments, the conveying system may comprise a motor adapted to drive the driving shaft.

In a third aspect, a manufacturing method of a conveyor is provided. The method comprises providing a carrying member adapted to carry an object to be conveyed; arranging a plurality of rollers under the carrying member. The plurality of rollers is adapted to be guided to move along guide rails in a first direction. The method further comprises arranging a first magnetic engaging portion to extend from a lower surface of the carrying member to a position near to the guide rails in a second direction normal to the first direction and adapted to interact with a second magnetic engaging portion on the guide rails, to generate a driving force for driving the conveyor in the first direction.

In this way, the conveyor of the first aspect of can be manufactured with a simple structure and low cost. In order to save costs, the conventional magnetic conveyor can be replaced by the conveyor according to the first aspect, without having to replace other components, such as guide rail, in the conveying system.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1A:
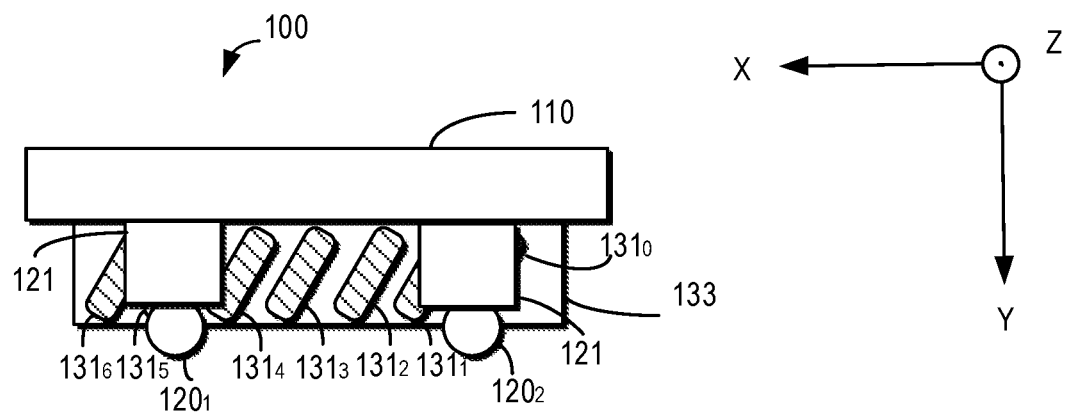
FIGS. 1A and 1B show a side view of a conveyor according to embodiments of the present disclosure.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As mentioned above, in a Computer, Communication and Consumer (3C) industries, various products need to be assembled in a clean room, i.e. a dustless environment. Thus, components to be assembled are required to be carried and conveyed to the clean room rapidly and safety. Particles may be generated by mechanical engagement or friction in a conventional way. In order to eliminate most of contacting during conveying, the magnetic engaging components can be used for the conveying.

However, the conveyor has the limitation of speed and load capacity due to insufficient driving force and the weak magnetic field engagement. Thus, a conveyor with high efficiency and low cost is expected.

Figure 1B:
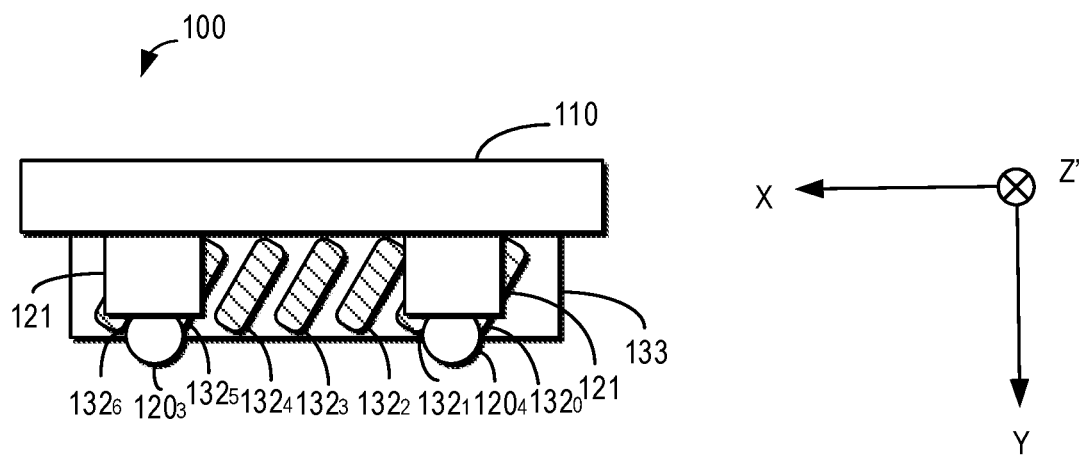

FIGS. 1A and 1B show a side view of a conveyor according to embodiments of the present disclosure. In a case that the conveyor 100 moves along with the direction X, FIG. 1A, for example, may show the conveyor 100 from left side, i.e. in a direction Z while FIG. 1B show the conveyor 100 from the right side, i.e. in a direction Z' opposite to the direction Z. The direction Z and Z' are arranged to be normal to the direction X.

As shown, the conveyor 100 may comprise a carrying member 110. An object to be conveyed may be carried by the carrying member 110 and transferred to a target destination. A plurality of rollers can be arranged under the carrying member 110. For example, as shown, two pairs of rollers $120_1$, $120_2$ and $120_3$ and $120_4$, hereafter may be referred to rollers 120 collectively, can be mounted under the carrying member 110. The plurality of rollers 120 may be guided to be moved on the specific rails (not shown) along the driving direction X.

A first magnetic engaging portion 130 may be arranged to extend from a lower surface of the carrying member 110 to a position near to the guide rails (not shown), on which the conveyor 100 can be guided to move, in a second direction Y. The first magnetic engaging portion 130 may comprises a first set of magnetic racks $131_0$-$131_6$ (as shown in FIG. 1A and hereafter may be also referred to as a first set of magnetic racks 131 collectively) and a second set of magnetic racks $132_0$-$132_6$ (as shown in FIG. 1B and hereafter may be also referred to as a second set of magnetic racks 132 collectively.) The second set of magnetic racks 132 may be arranged opposite to the first set of magnetic racks 131.

It should be understood that the first set of magnetic racks $131_0$-$131_6$ and the second set of magnetic racks $132_0$-$132_6$ may be covered by other elements, for example, a supporting element and therefore cannot be seen in the direction Z and Z'. The illustration of the magnetic racks as shown in FIGS. 1A and 1B is only for the sake of explanation.

In some embodiments, the first magnetic engaging portion 130 may comprise a pair of first supporting members 133, which may be arranged under the carrying member 110 and configured to support the first set of magnetic racks 131 and the second set of magnetic racks 132 respectively.

Additional, in some embodiments, the conveyor 100 may further comprises a pair of second supporting members 121 fixed on the lower surface of the carrying member 110. The plurality of rollers 120 may be mounted on the respective second supporting members 121.

Figure 2:
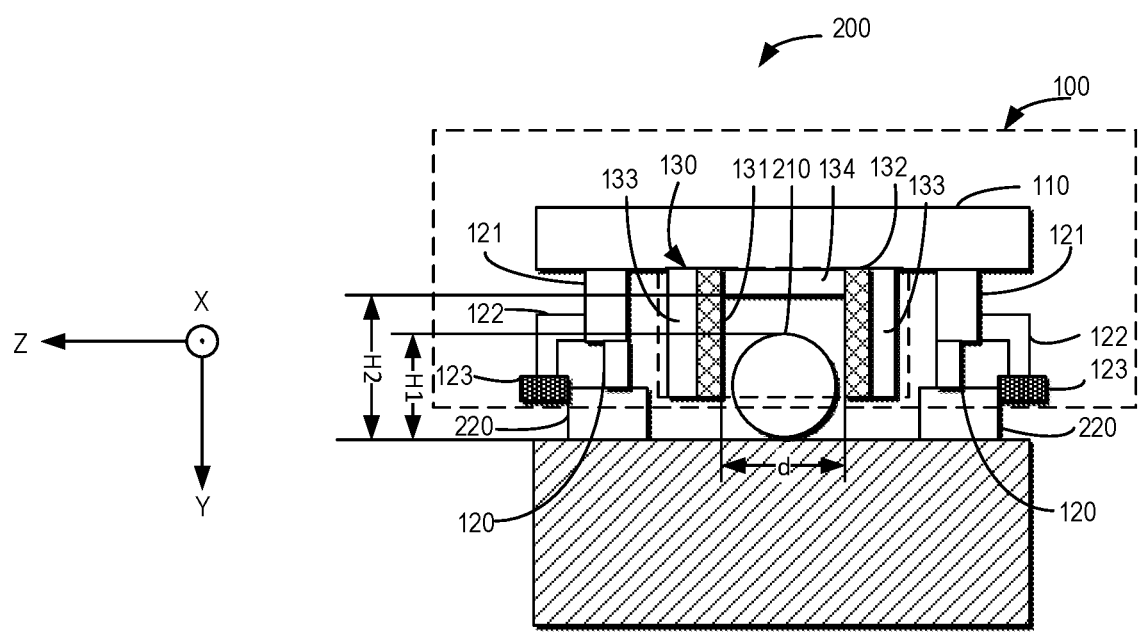
FIG. 2 shows a front view of a conveying system having a conveyor according to embodiments of the present disclosure.

FIG. 2 shows a front view of a conveying system 200 having a conveyor 100 according to embodiments of the present disclosure. With reference to FIG. 2, the magnetic engagement arrangement according to the present disclosure may be further described in detail.

As shown in FIG. 2, a plurality of rollers 120 of the conveyor 100 can be guided to move along guide rails 220 in a driving direction X, for example, to transfer electronic components to be mounted in the clean room to the target destination. The first magnetic engaging portion 130 can extend from a lower surface of the carrying member 110 to a position near to the guide rails 220 in a direction Y, which may be normal to the driving direction X. When the magnetic field is generated at the second engagement portion 210 on the guide rails 220 of the conveying system 200, the first magnetic engaging portion 130 may interact with a second magnetic engaging portion 210, to generate a driving force in the driving direction X, so that the conveyor 100 may be driven by the driving force.

In this way, compare with the conventional magnetic engagement arrangement, the first magnetic engaging portion 130 of the conveyor 100 may be disposed closer to the second magnetic engagement portion 210 and therefore may interact better with the second magnetic engagement portion 210 when a magnetic field is generated at the second magnetic engagement portion 210. By using this novel magnetic engagement arrangement, a sufficient driving force can be generated to improve the carrying capacity of the conveyor 100.

Meanwhile, the conveyor will be lifted up at an assembly location. The first magnetic engaging portion of the first aspect makes it easier to separate the first magnetic engaging portion from the the second magnetic engagement portion at a tangible direction of the the second magnetic engagement portion. Without step change of magnetic force during separating, the lifting up motion can be smoother.

As shown in FIG. 2, the second set of magnetic racks 132 may be arranged opposite to the first set of magnetic racks 131 at a predetermined distance d from the first set of magnetic racks 131 such that the second magnetic engaging portion 210 is located between the first set of magnetic racks 131 and the second set of magnetic racks 132.

In this way, a plurality of magnetic racks 131 and 132 can be arranged around the second magnetic engaging portion 210, which may protrude from the guide rails 220 such that the magnetic engagement between the first magnetic engaging portion 130 and the second magnetic engaging portion 210 becomes more strengthen. Therefore, the driving capacity of the magnetic conveyor 100, especially the speed and load capacity of the conveyor 100 can be significantly increased with the embraced magnetic field engagement around the second magnetic engaging portion 210.

Furthermore, in some embodiments, the first magnetic engaging portion 130 may further comprise a connecting element 134 fixed on the lower surface of the carrying member 110 and a pair of first supporting members 133 connected to the connecting element 134, by which the first set of magnetic racks 131 and the second set of magnetic racks 132 may be supported respectively.

By using the connecting element and the pair of first supporting members, a simple and stable connection of plurality of sets of magnetic racks to the carrying member may be achieved, which is an indispensable intermediate structure for implementing the magnetic rack arrangement of the present disclosure.

As mentioned above, a pair of second supporting members 121 may be fixed on the lower surface of the carrying member 110 and the plurality of rollers 120 may be mounted on the respective second supporting members 121. In this way, as shown in FIG. 2, a height H2 from a lower end of the connecting element to a bottom of the magnetic engagement portion is greater than a height H1 of the second magnetic engagement portion.

Due to the position of the magnetic rack arrangement, which extends towards to the guide rails in a direction Y, the height of the conveyor 100 may be adjusted to avoid the contact between the connecting element 134 and the second magnetic engagement portion 210, because particles may be generated due to the friction during the conveying, which is unexpected for the dustless environment. The second supporting members 121 may lift the height of the conveyor 100, which maintains the first magnetic engaging portion 130 to be located at a position near the second magnetic engaging portion 210 without contacting the second magnetic engagement portion 210.

In some embodiments, the conveyor 100 may further comprise a pair of third supporting members 122 fixed on the respective second supporting members 121 and limiting member 123 mounted in the respective third supporting members 122 and adapted to limit the movement of the conveyor on the guide rails 220. For example, the limiting member 123 may be formed as a roller. As an option, the limiting member 123 may also be formed as a limiting block. In this way, the conveyor can be maintained on the guide rails to ensure a stable conveying process.

Figure 3A:
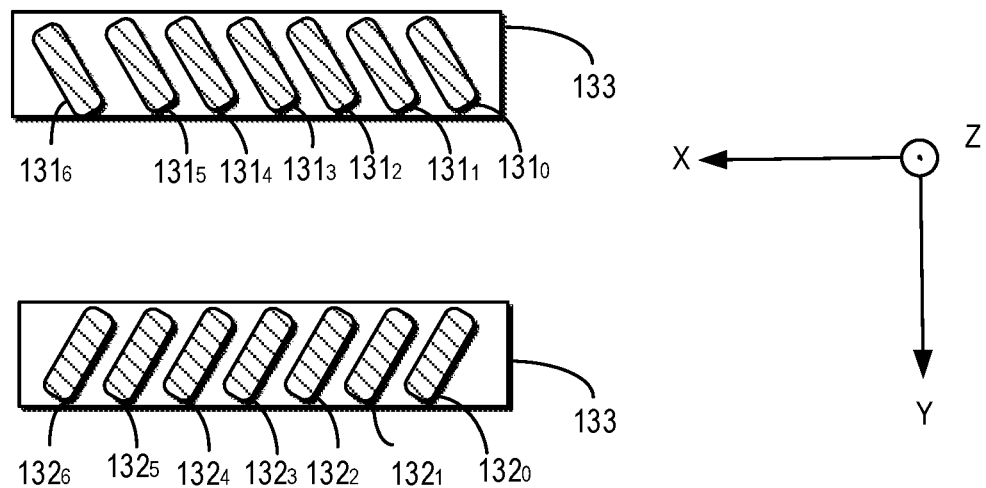
FIGS. 3A and 3B show the inclined magnetic racks according to embodiments of the present disclosure.
Figure 3B:
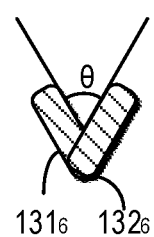

In addition, the first set of magnetic racks and the second set of magnetic racks may be arranged to be inclined with respect to the direction Y on the respective first supporting members, which may further refer to FIGS. 3A and 3B, which show the perspective view of the inclined magnetic racks according to embodiments of the present disclosure in the direction Z.

As shown in FIG. 3A, the first set of magnetic racks $131_0$-$131_6$ and the second set of magnetic racks $132_0$-$132_6$ may be arranged to be inclined in opposite directions with respect to the second direction Y on the respective first supporting members 133.

In some embodiments, each of the first set of magnetic racks $131_0$-$131_6$ may be inclined to form a predetermined angle with the respective ones of the second set of magnetic racks $132_0$-$132_6$. For example, FIG. 3B shows the angle θ formed between the magnetic rack $131_0$ and the magnetic rack $132_0$ when assuming that the magnetic rack $131_0$ and the magnetic rack $132_0$ are placed in a same plane.

As an option, the predetermined angle θ may correspond to half of an inclination angle of a magnetic pole generated by the second magnetic engagement portion 210 with respect to the direction Y. By this inclination arrangement of the first and the second magnetic engagement portions, the driving force caused by the magnetic field may be optimized and therefore the plurality of rollers can slide more smoothly and rapidly.

Figure 4:
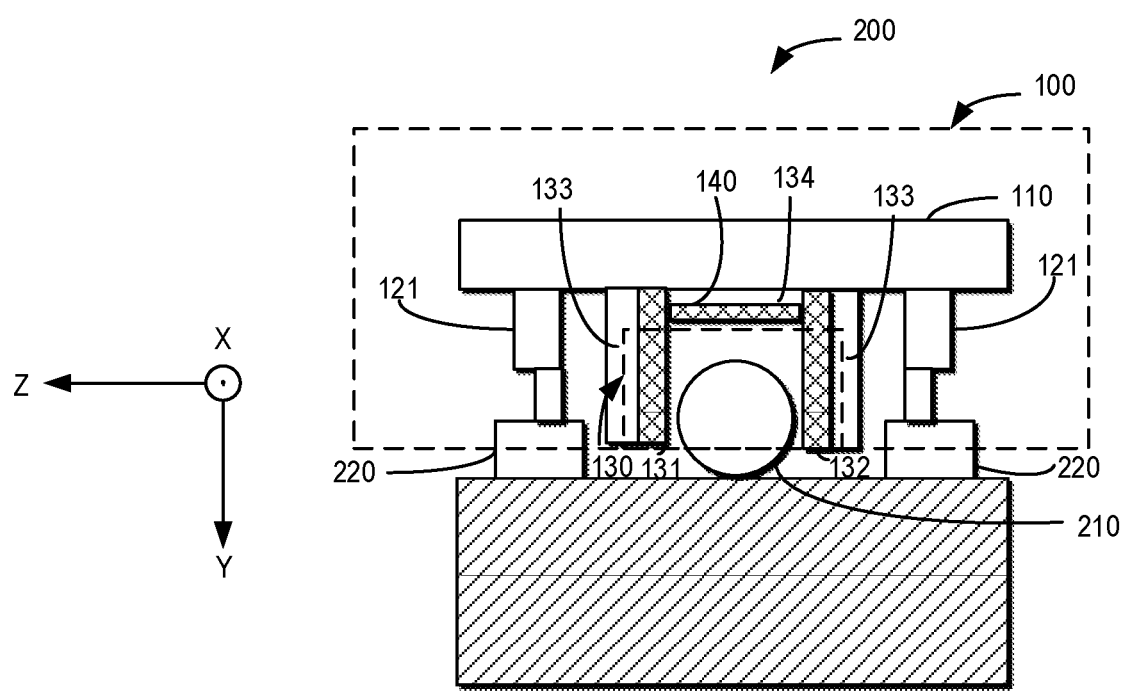
FIG. 4 shows a front view of a conveying system having a conveyor according to embodiments of the present disclosure.

FIG. 4 shows a front view of a conveying system 200 having a further conveyor 100 according to embodiments of the present disclosure. The most components and structures shown in FIG. 4 are same or similar with the conveyor shown in FIG. 2, which may not be repetitively explained here.

Different with the conveyor shown in FIG. 2, the conveyor 100 shown in FIG. 4 may further comprise a third magnetic engaging portion 140 arranged on the connecting element 134. The third magnetic engaging portion 140 may also interact with the second magnetic engaging portion 210 on the guide rails 220, which may further increase the driving capacity of the magnetic conveyor.

By illustrating the embodiments in FIG. 1A to FIG. 4, a novel magnetic engagement arrangement has been explained. It can be realized, from figures and description, the driving capacity and the load capacity of the conveyor may be increased due to a more strengthen magnetic engagement between the first and the second magnetic engagement portions.

Figure 5A:
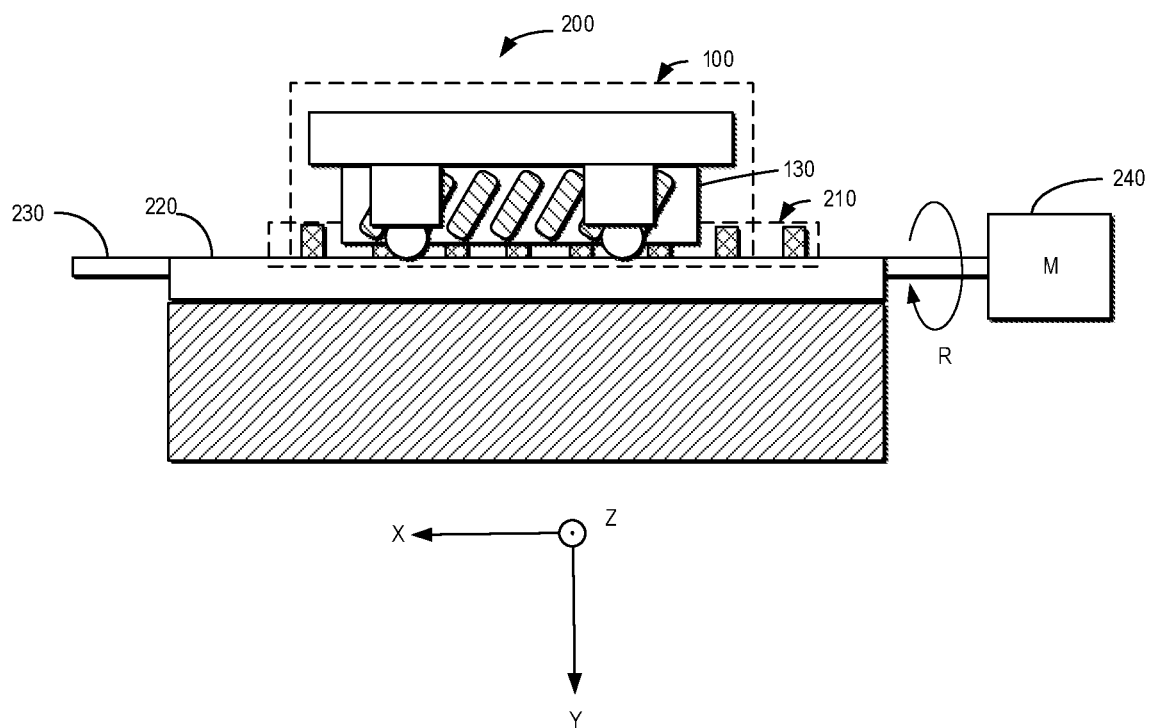
FIGS. 5A and 5B show a side view of a conveying system having the conveyor according to further embodiments of the present disclosure.
Figure 5B:
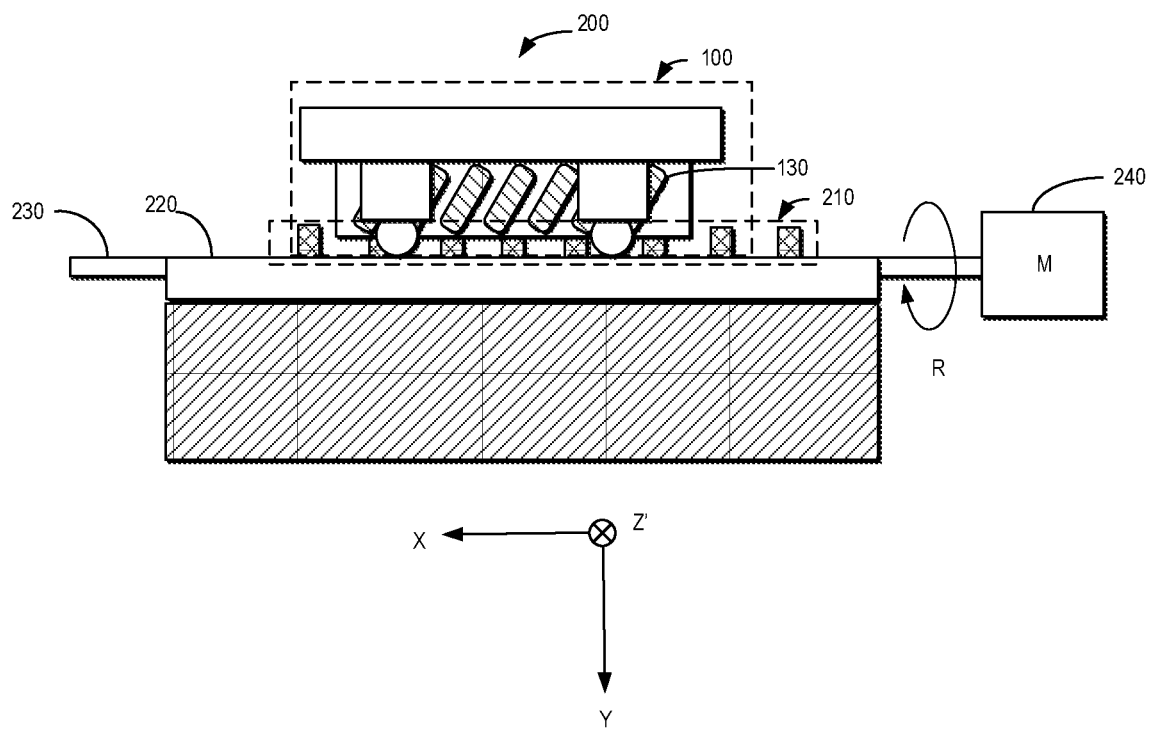

The present disclosure also proposes a conveying system having the conveyor as mentioned above. FIGS. 5A and 5B show a side view of a conveying system having the conveyor according to further embodiments of the present disclosure. In a case that the conveyor 100 moves along with the direction X, FIG. 5A, for example, may show the conveying system 200 from left side (in a direction Z) while FIG. 5B show the conveying system 200 from the right side (in a direction Z'). With reference to FIGS. 5A and 5B, a conveying system will be explained as below.

As shown, the conveying system 200 comprises a conveyor 100 which has been described above. The conveying system 200 may further comprise guide rails 220, which can guide the plurality of rollers 120 of the conveyor 100, to move the conveyor 100 in the driving direction X.

Furthermore, the conveying system 200 may also comprise a driving shaft 230. The conveyor 100 may be arranged between the guide rails 220. When the power is applied to the driving shaft 230, the driving shaft 230 may be driven to rotate in a rotating direction R. It should be understood that only a schematic rotating direction R is shown in FIGS. 5A and 5B, which can be set to be clockwise or counterclockwise depending on the application.

In addition, the conveying system 200 may also comprise a second magnetic engaging portion 210 comprising a plurality of magnetic gear arranged on the driving shaft 230. The plurality of magnetic gear may be configured to rotate with the rotation of the driving shaft 230, to generate a magnetic field.

In some embodiments, the conveying system 200 may also comprise a motor M, which may be configured to apply the power to the driving shaft 230, to drive the driving shaft to be rotated.

Due to the increased driving capacity of the conveyor, a conveying system with a simple structure and low-cost can be achieved, thereby the performance and the efficiency of the conveying system can be improved.

Figure 6:
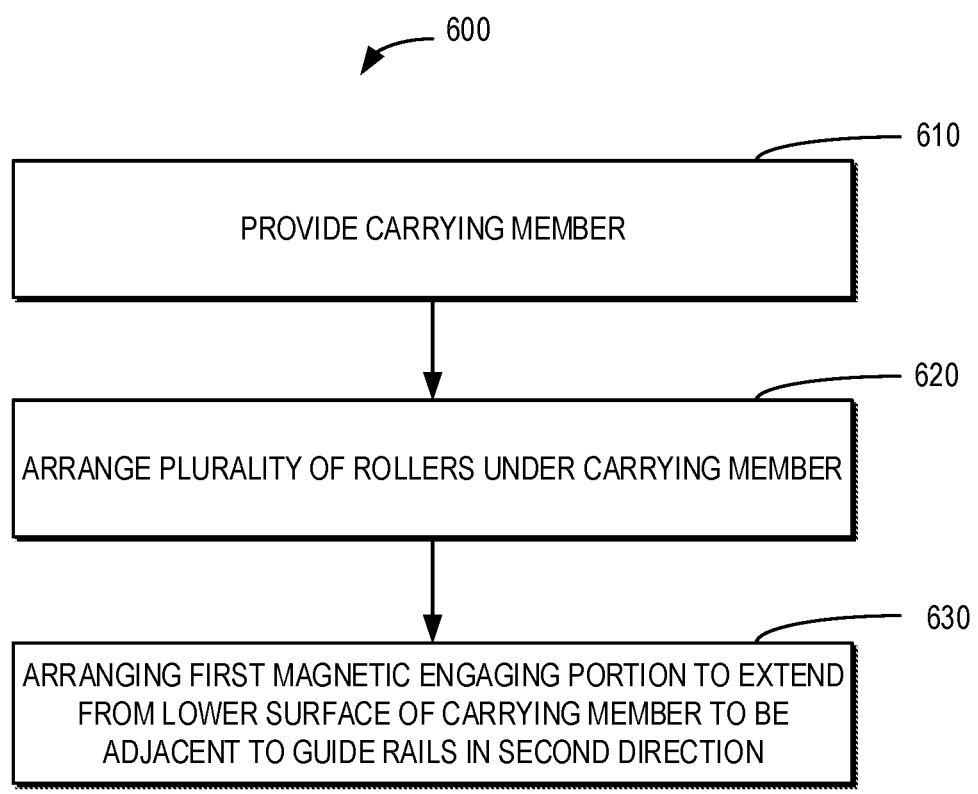
FIG. 6 shows a flowchart illustrating a manufacturing method of a conveyor according to embodiments of the present disclosure.

Furthermore, a method 600 of manufacturing a conveyor according to the embodiments of the present disclosure is provided. FIG. 6 shows a flowchart illustrating a manufacturing method of a conveyor according to embodiments of the present disclosure. The method 600 may be implemented for manufacturing the conveyor 100 described with reference to FIG. 1A to FIG. 4.

At 610, a carrying member is provided to carry an object to be conveyed. At 620, a plurality of rollers is arranged under the carrying member. The plurality of rollers is adapted to be guided to move along guide rails in a first direction.

At 630, a first magnetic engaging portion is arranged to extend from a lower surface of the carrying member to a position near to the guide rails in a second direction normal to the first direction. The first magnetic engaging portion can interact with a second magnetic engaging portion on the guide rails, to generate a driving force for driving the conveyor in the first direction.

In this way, the conveyor of the first aspect of can be manufactured with a simple structure and low cost. In order to save costs, the conventional magnetic conveyor can be replaced by the conveyor according to the first aspect, without having to replace other components, such as guide rail, in the conveying system.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A conveyor comprising:
   a carrying member adapted to carry an object to be conveyed;
   a plurality of rollers arranged under the carrying member and adapted to be guided to move along guide rails in a first direction; and a first magnetic engaging portion arranged to extend from a lower surface of the carrying member to a position near to the guide rails in a second direction normal to the first direction and adapted to interact with a second magnetic engaging portion on the guide rails, to generate a driving force for driving the conveyor in the first direction;

wherein the first magnetic engaging portion comprises:
a first set of magnetic racks,
a second set of magnetic racks arranged opposite to the first set of magnetic racks at a predetermined distance from the first set of magnetic racks such that the second magnetic engaging portion is located between the first set of magnetic racks and the second set of magnetic racks,
a connecting element fixed on the lower surface of the carrying member,
a pair of first supporting members connected to the connecting element and adapted to support the first set of magnetic racks and the second set of magnetic racks respectively, and
wherein the first set of magnetic racks and the second set of magnetic racks are arranged to be inclined in opposite directions with respect to the second direction on the respective first supporting members.

2. A conveying system comprising:
a conveyor according to claim 1;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

3. The conveying system of claim 2, further comprising a motor adapted to drive the driving shaft.

4. A conveying system comprising:
a conveyor according to claim 1;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

5. The conveyor of claim 1, wherein the first set of magnetic racks is inclined to form a predetermined angle θ with the second set of magnetic racks, and wherein the predetermined angle θ corresponds to half of an inclination angle of a magnetic pole generated by the second magnetic engagement portion with respect to the second direction.

6. The conveyor of claim 1, wherein the conveyor further comprises a third magnetic engaging portion arranged on the connecting element and adapted to interact with the second magnetic engaging portion on the guide rails.

7. The conveyor of claim 1, wherein the conveyor further comprises a pair of second supporting members fixed on the lower surface of the carrying member, and
wherein the plurality of rollers are mounted on the respective second supporting members such that a second height from a lower end of the connecting element to a bottom of the second magnetic engagement portion is greater than a first height of the second magnetic engagement portion.

8. The conveyor of claim 7, wherein the conveyor further comprises:
a pair of third supporting members fixed on the respective second supporting members; and
a limiting member mounted in the respective third supporting members and adapted to limit a movement of the conveyor on the guide rails.

9. A conveying system comprising:
a conveyor according to claim 1;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

10. The conveying system of claim 9, further comprising a motor adapted to drive the driving shaft.

11. A conveying system comprising:
a conveyor according to claim 1;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

12. The conveying system of claim 11, further comprising a motor adapted to drive the driving shaft.

13. A conveying system comprising:
a conveyor according to claim 5;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

14. A conveying system comprising:
a conveyor according to claim 6;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

15. A conveying system comprising:
a conveyor according to claim 7;
guide rails adapted to guide the plurality of rollers to move the conveyor in the first direction;
a driving shaft arranged between the guide rails and adapted to be driven to rotate in a third direction; and
a second magnetic engaging portion comprising a plurality of magnetic gear arranged on the driving shaft and adapted to rotate with a rotation of the driving shaft, to generate a magnetic field.

16. A conveying system comprising:
a conveyor according to claim 8;
guide rails adapted to guide the plurality of rollers to move the conveyor in the first direction;
a driving shaft arranged between the guide rails and adapted to be driven to rotate in a third direction; and a second magnetic engaging portion comprising a plurality of magnetic gear arranged on the driving shaft and adapted to rotate with a rotation of the driving shaft, to generate a magnetic field.

17. A manufacturing method of a conveyor comprising:
providing a carrying member adapted to carry an object to be conveyed;
arranging a plurality of rollers under the carrying member, the plurality of rollers being adapted to be guided to move along guide rails in a first direction;
arranging a first magnetic engaging portion to extend from a lower surface of the carrying member to a position near to the guide rails in a second direction normal to the first direction and adapted to interact with a second magnetic engaging portion on the guide rails, to generate a driving force for driving the conveyor in the first direction;
arranging a first set of magnetic racks and a second set of magnetic racks on the first magnetic engaging portion, the second set of magnetic racks arranged opposite to the first set of magnetic racks at a predetermined distance from the first set of magnetic racks;
arranging a connecting element fixed on the lower surface of the carrying member;
arranging a pair of first supporting members connected to the connecting element and adapted to extend from the lower surface of the carrying member to support the first set of magnetic racks and the second set of magnetic racks respectively; and
wherein the first set of magnetic racks and the second set of magnetic racks are arranged to be inclined in opposite directions with respect to the second direction on the respective first supporting members.

\* \* \* \* \*